Sept. 20, 1927.  1,643,018
F. KRANTZ ET AL
PLANT FOR FERMENTING AND STORING ORGANIC
MANURE, FOODSTUFFS, AND THE LIKE
Filed Nov. 15, 1922   2 Sheets-Sheet 2
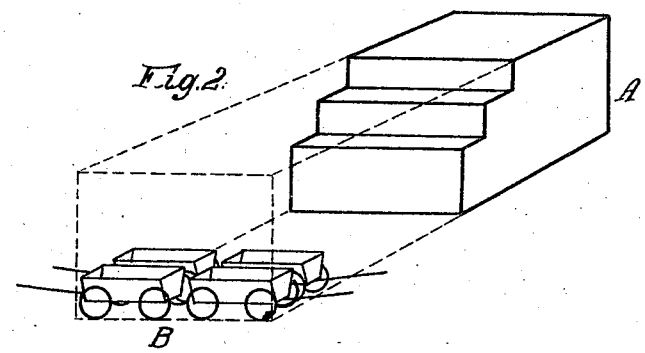
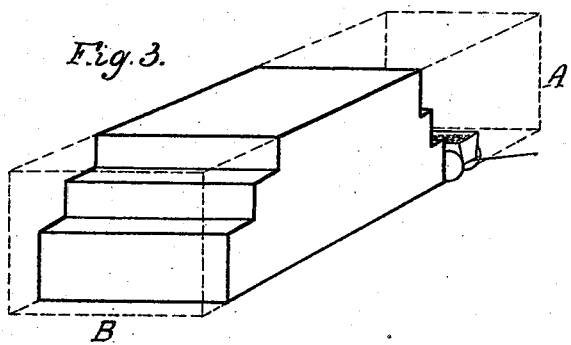
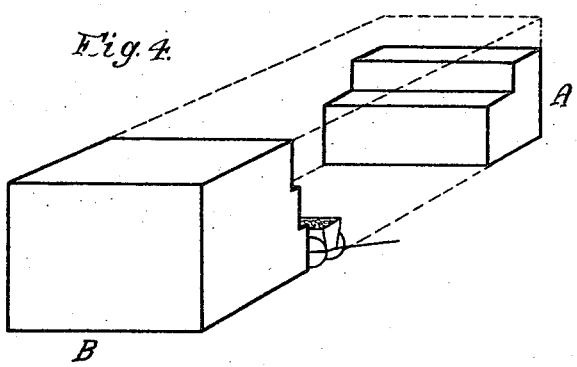
INVENTORS,
FRITZ KRANTZ
AND HEINRICH KRANTZ,
BY Richards & Geier
ATTYS.

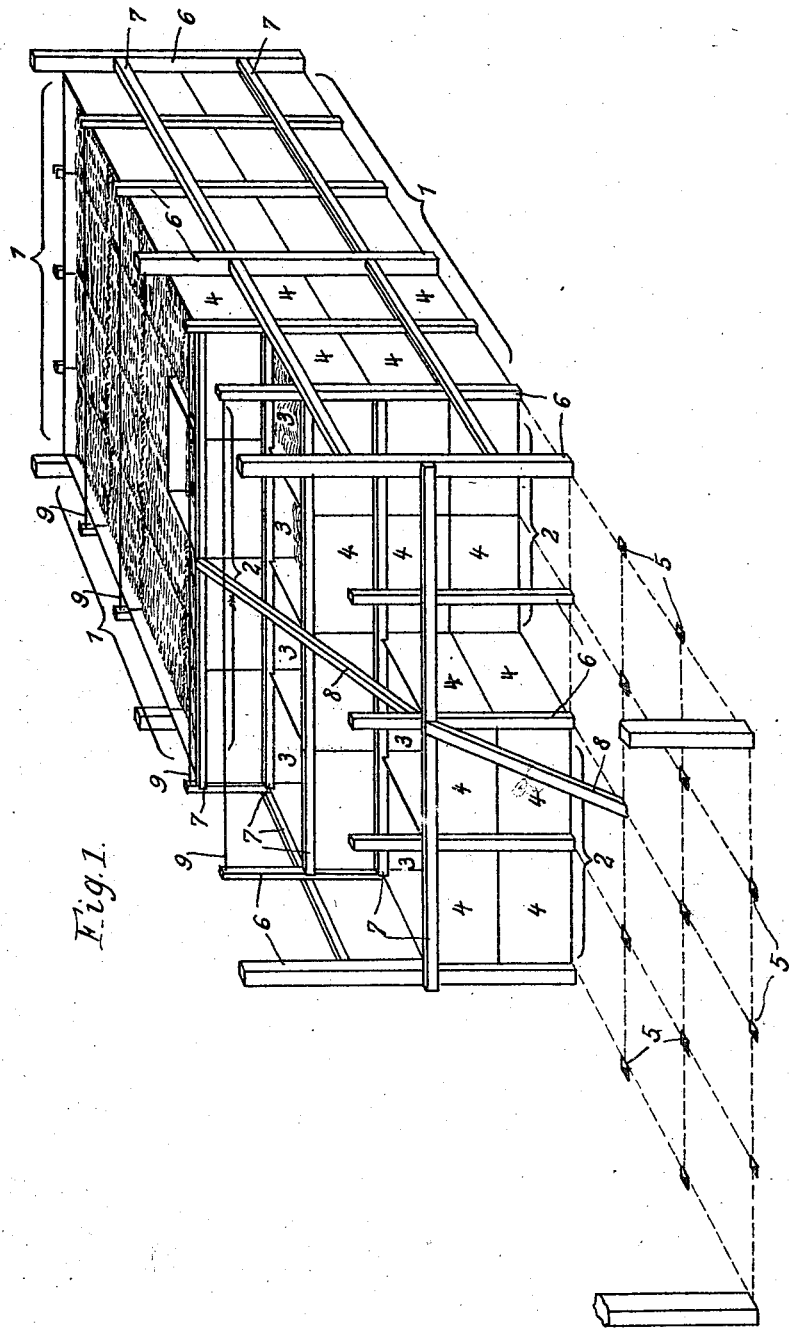

Patented Sept. 20, 1927.

1,643,018

UNITED STATES PATENT OFFICE.

FRITZ KRANTZ, OF MUNICH, AND HEINRICH KRANTZ, OF BAD-NAUHEIM, GERMANY.

PLANT FOR FERMENTING AND STORING ORGANIC MANURE, FOODSTUFFS, AND THE LIKE.

Application filed November 15, 1922, Serial No. 601,187, and in Germany November 15, 1921.

This invention relates to improvements of plants for fermenting and storing organic manure, food stuffs and the like.

The fermentation chambers and silos which are frequently used in agriculture present numerous difficulties, especially as regards uniform controlling of the fermenting process, which difficulties increase and become very serious as soon as the quantity of the material to be fermented and consequently the space required by the same exceeds a certain limit.

The principal object of this invention is to provide a new and improved plant for carrying on the fermentation process, which plant is constructed to avoid the difficulties in the former constructions and to enable the plant to be constructed at a comparatively small initial expense, while allowing greater limits with respect to the variation in the quantities of the material to be treated.

A further object is to provide a new improved construction which will enable the charging of the plant, the regulation of the fermentation process and the removal of the material from the plant to be carried out in a very easy manner.

In order that the invention may be clearly understood, we will proceed to describe the same with reference to the forms of construction shown in the accompanying drawings, wherein:—

Fig. 1 is a perspective view of the plant.

Figs. 2, 3 and 4 respectively illustrate diagrammatically the charging and putting up of a plant, the emptying of the plant at the rear end and the charging of the same at the other end, and the putting up of a new plant at one end whilst the old plant is being emptied at the other end.

The encasing of the material to be fermented (Fig. 1) for putting the same into proper shape, for preventing losses and for shutting the same off toward the outside, is effected by constructing outer movable wall elements 1 which can be put in place singly before the material is filled in and which can be removed singly after the material has been filled in.

A larger plant is preferably subdivided into cells 3 of comparatively small section by partitions 2, adapted to be inserted and removed separately. Each cell can be charged separately with the material to be fermented. The partitions which serve to separate the material brought in form the space designed for adjacent cells to be charged later on, and are removed as soon as fresh material is brought up or at the latest after the adjacent cell has been charged with the material.

The outer walls and the partitions are preferably composed of similar standard units 4. With smaller plants this subdivision is not necessary, at least at the small sides of the plant. The fact that the partitions are composed of standard units permits the plant to be built upwardly according to the progressive filling thereof, the cell which is being charged permitting the further successive removal of the units from below upwardly in accordance with the progressive charging of the plant.

The plankings are held by removable parts, for instance, posts 6 mounted in step-bearings 5, by transverse beams 7 and by stays 8 which serve also to intercept the lateral pressure exerted by the material. In addition to the posts and stays, or as substitute for the same, wire bracings 9 could be used, which can be arranged at any height and in any direction. The posts can be utilized at the same time for supporting the roof and the means for charging the material into the plant and said posts as well as the stays can be constructed as framework.

As the elements and the holding devices need to be erected only to such an extent as required by the quantity of the material to be encased, and as they can be removed if no longer wanted, the widest facilities exist for the charging and removal as regards place, extent and direction. This liberty of selection is, not to mention other general advantages, of decisive importance for the systematic fermentation of very large continuously accruing quantities of material, for instance, of organic manure. In the course of charging of the total plant, a considerable part of the elements 1 and holding devices may be released for repeated use, as soon as sufficient adjacent cells have been charged. The charging or filling of an adjacent cell provides sufficient security or bracings for the material in the cell from which the partitions have been removed, so as to prevent the material in the first charged cell from slipping laterally. Furthermore, when the material is settled sufficiently to form a substantial coherent mass, the tendency to laterally slipping is no longer present, and therefore, at such time, the holding devices may be removed.

Figs. 2, 3 and 4 show, by way of example, the working of a total plant. The limits of the space available for storing the material are indicated in dash lines and the plankings and the like are left out for clearness sake. The charging progresses in the direction A—B (Fig. 2), and the fermented material can be removed at the end A whilst fresh material is added in the direction B (Fig. 3). After the charging of the material has been terminated at B it begins again at A, the fermented material still being removed in the direction toward B (Fig. 4). At the point where fermented material is taken off the plankings and holding devices are removed so that vehicles can be brought closely to the point at which the fermented material (which has settled and stands like peat) is being cut off, to transport the same. The cutting off is carried out in steps like the charging, these cutting off steps being obviously not limited to the area of the fermenting cells and being preferably made as steep as the solidity of the fermenting material permits.

In short the whole plant is being operated in a proceeding way. As organic manure, for instance, is produced from one end of the year to the other but is used only at determined periods after it has been stored for a long time, this means an extraordinarily great saving of material in comparison with the stationary fermenting chambers, this saving being quite as important for the agricultural management as the facility of transport, which is not impeded by any stationary devices, and the fact that the free part of the ground is always ready to be used for the other purpose (for instance for parking vehicles and machines in the farmyard where generally there is a great lack of space, see (Fig. 2). As the material to be fermented, especially organic manure, must frequently be stored for a long time, it is necessary to prevent damage to the material near the outer walls, and therefore the outer walls are preferably sheathed with light protective sheathing arranged at a convenient interval from the outer surface of the manure, this material being filled with a convenient insulating material, for instance, saw dust, peat dust and the like. These protective sheathings are removable so that they can be filled separately from the outer walls and so that the insulating material can be packed in or removed separately, and as the same protective sheathing may be used successively at different points of the piled up material, use of such protection involves comparatively slight additional expense.

We claim:—

1. An apparatus for the fermentation and subsequent storage of manure, food stuffs and the like, which apparatus consists of a plurality of upright posts, removable wall units adapted to cooperate with said posts to form walls, each complete unit so formed including a plurality of said wall units one above another, and removable elements cooperating with said posts for retaining said wall units in position, said posts and retaining elements being constructed and arranged to permit the removal of the individual wall units in any desired order.

2. An apparatus for the fermentation and subsequent storage of manure, food stuffs and the like, which apparatus consists of a plurality of upright posts removable wall units adapted to cooperate with said posts to form walls, each complete unit so formed including a plurality of said wall units one above another, and removable elements cooperating with said posts for retaining said wall units in position, said posts and retaining elements being constructed and arranged to permit the removal of the individual wall units in any desired order, and said apparatus being subdivided into cells by partitions which are constructed of individual wall units of the same nature and held in place in the same manner as the afore-mentioned wall units.

In testimony whereof we have affixed our signatures.

FRITZ KRANTZ.
HEINRICH KRANTZ.